UNITED STATES PATENT OFFICE.

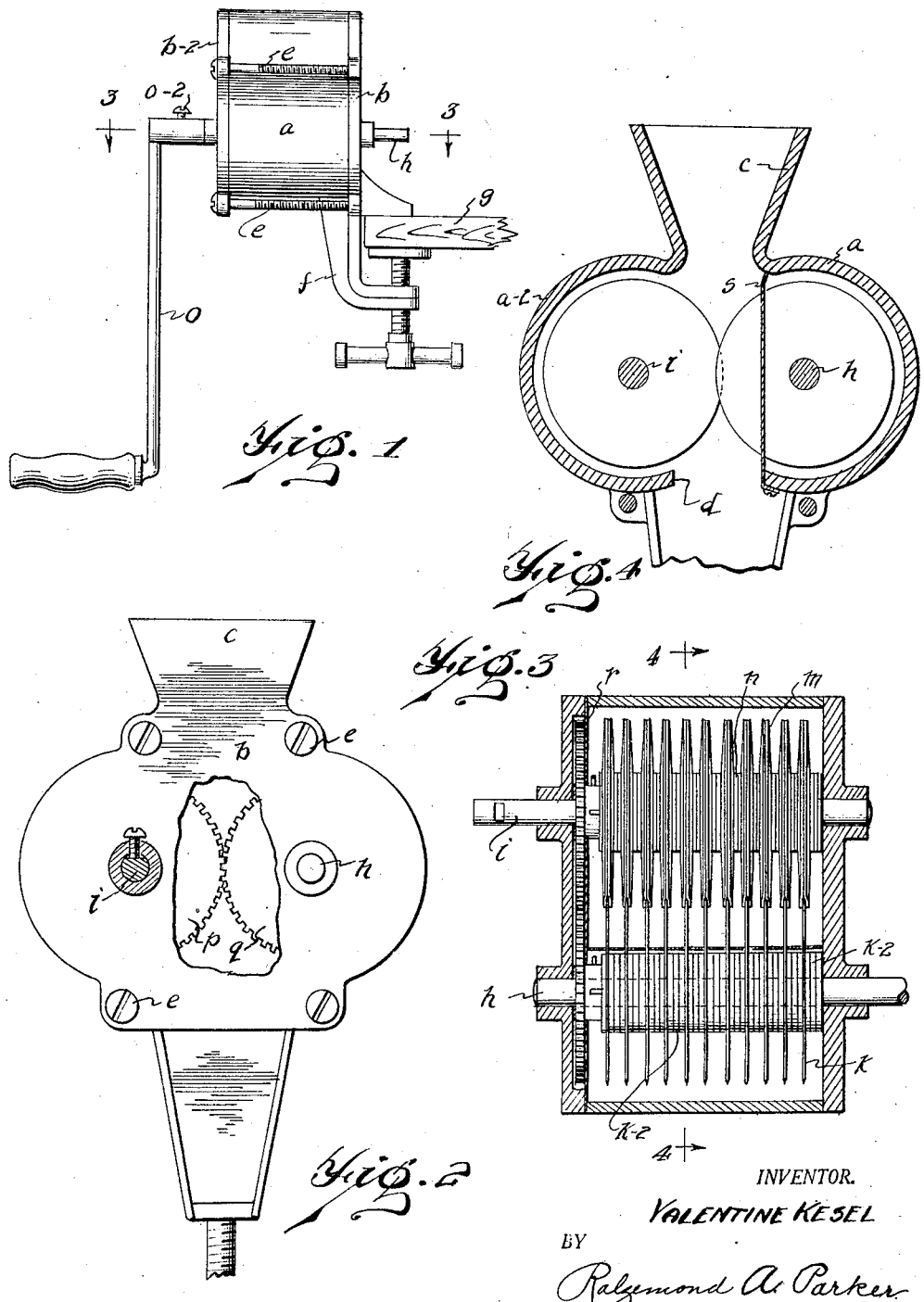

VALENTINE KESEL, OF DETROIT, MICHIGAN.

VEGETABLE-SLICING MACHINE.

1,406,194.  Specification of Letters Patent.  Patented Feb. 14, 1922.

Application filed April 27, 1921. Serial No. 464,898.

*To all whom it may concern:*

Be it known that I, VALENTINE KESEL, a citizen of the United States, residing at Detroit, county of Wayne, State of Michigan, have invented a certain new and useful Improvement in Vegetable-Slicing Machines, and declare the following to be a full, clear, and exact description of the same, such as will enable others skilled in the art to which it pertains to make and use the same, reference being had to the accompanying drawings, which form a part of this specification.

My invention relates to vegetable cutters. The object is to provide a vegetable cutting machine so constructed as to disintegrate the vegetables, slicing them into long strips, and is particularly adapted for slicing green beans, potatoes, etc., into long narrow shreds.

A further object is to provide a vegetable cutter which comprises a rotary cutting element carrying a plurality of cutter discs which form such a frictional engagement with a similar plurality of feed discs carried by a rotary feed element, as to be kept in a sharpened condition.

A further object is to provide a vegetable cutter, comprising a rotatably journaled cutting element carrying a plurality of spaced-apart, circular cutter knives, and a rotatably journaled feed element carrying a plurality of spaced-apart feed discs, so relatively positioned that the vegetables are drawn downwardly between the cutter knives, and the knives of which are so engaged with the feed discs as to be sharpened thereby during rotation.

A further object is to provide a device of the class described of simple, compact, inexpensive construction adapted to be easily taken apart for cleaning, and composed of a minimum of parts.

These and other objects, together with details of construction, will more fully appear from the following description, appended claims, and accompanying drawings, in which:

Figure 1 is a side elevation of my improved cutter secured to a table.

Figure 2 is an end elevation of my cutter.

Figure 3 is a horizontal section taken on line 3—3 of Figure 1.

Figure 4 is a vertical section taken on line 4—4 of Figure 3.

My improved vegetable cutting machine comprises a casing, in which are journaled for rotation cutting elements. The casing comprises side plates $a$ and $a^2$ secured together by means of end plates $b$ and $b^2$. There is provided at the top a flaring hopper $c$, and at the bottom, an outlet port $d$, through which the disintegrated vegetables are discharged. As here shown, these end and side plates are held together by means of screws $e$, though it is apparent that any suitable method of securing such plates together might be employed.

Journaled within the end plates of the casing, and extending transversely therethrough are two substantially parallel spindles; cutting spindle $h$ and a feed spindle $i$. The spindle $h$ carries a plurality of circular cutter knives, suitably secured to said spindle so as to rotate therewith and held in substantially parallel, spaced-apart relationship thereon by means of spacer washers $k^2$. As here shown, these cutter knives are mounted on a round shaft, though it is apparent that the preferable construction might be to mount them upon a square shaft.

The feed spindle $i$ carries a plurality of circular concave feed discs $m$ arranged in pairs and held in spaced-apart, substantially parallel, relationship on said spindle $i$ by means of spacer washers $n$. The discs of each pair are so positioned that the concave sides are opposite each other, and a single spacer washer $n$ is inserted between the separate members of the pair. These discs are so formed and so mounted on the spindle that the separate discs in pair exert an inward spring tension toward each other at their peripheries.

The feed discs and the circular cutter knives are so relatively positioned that the cutter knives pass between separate members of the pairs of feed discs as shown in Figure 3 of the drawing. The over-lapping of the feed discs by the cutter knives as they pass there between is very slight, perhaps 1/16 to 3/64 of an inch. However, it is sufficient to maintain the sharpened edge of the knives in a sharpened condition. The feed discs are of a greater thickness than the knives, hence the interval between the successive cutter knives.

A handle $o$ is fastened to the spindle $i$ by means of a set screw $o^2$, and such spindle is provided with a fixed gear $p$ which meshes with a similar gear $q$ carried by the spindle $h$ so that both spindles revolve simultaneously though in opposite directions. A plate *r* is provided, extending transversely through the casing parallel the end plate $b^2$, so as to separate the gears *p* and *q* from the interior of the casing in order that they will not become clogged with the disintegrated vegetable matter. An interior wall *s* extends vertically through the casing, shutting off the cutter spindle from the main feed passageway so that the disintegrated vegetable matter will not wind around the cutter spindle in its rotation, impeding the operation of the machine. This wall *s* is provided with a succession of parallel slots through which the cutter knives project. I provide a clamping member, indicated in assembly as *f*, of well known construction, by means of which my machine may be attached to a table leaf, indicated as *g* in Figure 1.

In the operation of my device, the vegetable material to be sliced, is inserted in a hopper and when the spindles are rotated, passes down through the cutter knives and out of the discharge outlet *d*. Due to the fact that the feed discs are positioned closer together than the cutter knives and of greater thickness, the vegetable matter is forced to pass down between the knives rather than the feed discs. The vegetables are sliced in long strips and it is apparent that by changing the relative spacing of the knives and discs the size of the slices can be regulated and it would be preferable to provide two or three sets of cutter knives and discs with each machine, as they can be easily removed and other assembled units of knives and discs inserted in place.

Throughout the specification the rotary elements *m* have been termed "feed discs" or "feed elements." It is not the intention of inventor to give the impression that these elements are strictly speaking feeding discs. They are more nearly in the nature of the female members of a compound knife of which the cutter disc *k* comprises the male member of the combination. The edge of the disc *m* which contacts with the surface of the disc *k* serves as a cutting edge in the same manner that the edge of a blade of a pair of shears serves as a cutting edge and the principal purpose of the disc *m* is to retain the sharpened edge on the cutter disc *k* rather than to feed the vegetables through the cutting mechanism.

What I claim is:

1. In a vegetable cutter, in combination, a rotatably journaled cutter element carrying a plurality of spaced-apart, substantially parallel cutter discs, a rotatably journaled feed element carrying a plurality of spaced-apart, substantially parallel, pairs of feed discs, said feed discs in pair spaced-apart at the center where fastened to the shaft but so shaped as to be held yieldingly toward each other at the periphery, said cutter element so positioned relative the feed element that the cutter discs pass each between the separate members of a pair of feed discs.

2. In a vegetable cutter, in combination, a cutter spindle journaled for rotation carrying a plurality of spaced-apart, substantially parallel, cutter discs, a feed spindle journaled for rotation carrying a plurality of spaced-apart substantially parallel pairs of feed discs, each disc of the pair spaced-apart from its complementary disc in pair at the spindle but so formed that said discs in pair are held yieldingly together at their outer edge, said cutter spindle so positioned relative said feed spindle that the cutter discs pass between the feed discs and are frictionally engaged thereby, tangentially positioned stationary guard elements passing between separate cutter discs in such a manner as to prevent the shredded material from coming in contact with the cutter spindle.

3. In a vegetable cutter, in combination, a casing, a cutter spindle journaled therein for rotation, a plurality of spaced-apart, substantially parallel, circular, cutter knives carried by said spindle, a feed spindle journaled in said casing for rotation, a plurality of spaced-apart circular feed elements carried by said spindle, means for rotating said spindles, said spindles so relatively positioned that the cutter knives slightly overlap the feed elements said cutter knives forming frictional engagement with said feed elements as they pass therebetween.

4. In a vegetable cutter, in combination, a cutter spindle journaled for rotation, a plurality of spaced-apart, circular, cutter knives carried by said spindle, a feed spindle journaled for rotation adapted to be rotated in a direction opposite to the direction of rotation of the cutter spindle, means for rotating said spindles, a plurality of spaced-apart, circular, feed elements, carried by said feed spindle, said cutter knives slightly over-lapping said feed elements and forming frictional engagement therewith at their peripheries.

5. In a vegetable cutter, in combination, a casing, a cutter spindle journaled therein for rotation, a plurality of spaced-apart, substantially parallel, circular cutter knives carried by said spindle, a feed spindle journaled in said casing for rotation, a plurality of spaced-apart pairs of feed discs carried by said feed spindle, said feed discs in pair so shaped as to be held yieldingly toward each other at their periphery; said cutter spindle so positioned that the cutter discs pass between, forming a frictional engagement with the feed discs in pair, fixed guard elements extending between separate cutter discs tangentially thereto.

6. In a vegetable cutter, in combination, a casing, a cutter spindle journaled for rotation within said casing, a plurality of spaced-apart, cutter discs carried by said spindle, an interior slotted wall within said casing extending tangentially relative said cutter discs through the slots of which wall, individual cutter discs project, said wall co-operating with the casing to separate the cutter spindle from the feed passageway through the casing, a feed spindle journaled within said casing carrying a plurality of spaced-apart, feed discs so positioned that the cutter discs pass therebetween and so formed that they form frictional engagement therewith.

7. In a vegetable cutter, in combination, a casing, a cutter spindle journaled therein provided with a plurality of spaced-apart, substantially parallel, cutter discs, a feed spindle journaled within said casing provided with a plurality of spaced-apart, substantially parallel, pairs of feed discs, separate members of each pair being oppositely concave, said discs in pair spaced-apart where fastened to the spindle, but held yieldingly together at their peripheries, said cutter and feed spindles so positioned that the cutter discs slightly overlap passing between the separate feed discs in pair being frictionally engaged thereby.

In testimony whereof, I, VALENTINE KESEL, sign this specification.

VALENTINE KESEL.